United States Patent
Muth et al.

[11] Patent Number: 5,125,798
[45] Date of Patent: Jun. 30, 1992

[54] METHOD AND APPARATUS FOR COOLING AIR FLOW AT GAS TURBINE BUCKET TRAILING EDGE TIP

[75] Inventors: Myron C. Muth, Saratoga; R. Paul Chiu, Scotia, both of N.Y.

[73] Assignee: General Electric Company, Schenectady, N.Y.

[21] Appl. No.: 521,891

[22] Filed: Apr. 13, 1990

[51] Int. Cl.$^5$ .............................. F01D 5/18
[52] U.S. Cl. .................. 416/92; 416/97 R; 415/115
[58] Field of Search ............ 416/95, 96 R, 96 A, 416/97 R, 90 R, 92; 415/114, 115, 116

[56] References Cited

U.S. PATENT DOCUMENTS

| | | | |
|---|---|---|---|
| 2,750,147 | 6/1956 | Smith | 416/95 |
| 2,763,427 | 9/1956 | Lindsey | 416/97 R |
| 2,839,268 | 6/1958 | Allen | 416/95 |
| 2,883,151 | 4/1959 | Dolida | 416/96 R |
| 3,393,894 | 7/1966 | Redsell | 415/115 |
| 3,825,984 | 7/1974 | Linko et al. | 416/97 R |
| 3,867,068 | 2/1975 | Corsmeier et al. | 416/97 R |
| 4,073,599 | 2/1978 | Allen et al. | 416/96 R |
| 4,203,706 | 5/1980 | Hess | 416/97 A |
| 4,236,870 | 12/1980 | Hucul, Jr. et al. | 416/97 R |
| 4,453,888 | 6/1984 | Hovar et al. | 416/95 |
| 4,522,562 | 6/1985 | Glowacki et al. | 416/95 |
| 4,526,512 | 7/1985 | Hook | 416/97 R |
| 4,859,141 | 8/1989 | Maisch et al. | 415/115 |
| 4,992,026 | 2/1991 | Ohtomo et al. | 415/115 |

FOREIGN PATENT DOCUMENTS

| | | | |
|---|---|---|---|
| 3306894 | 8/1984 | Fed. Rep. of Germany | 416/92 |
| 641146 | 8/1950 | United Kingdom | 416/95 |

Primary Examiner—Edward K. Look
Assistant Examiner—James A. Larson
Attorney, Agent, or Firm—Nixon & Vanderhye

[57] ABSTRACT

An apparatus and method for varying the cooling air flow within a gas turbine bucket tip. Each turbomachinery blade contains at least one radial cooling passage located between a hollow interior and an outside of the blade. A transversely-oriented elongate channel connects at least one of the cooling passages with the trailing edge of the blade. Secured within the transversely-oriented channel is a pin which extends into at least one of the radial cooling passages to partially obstruct the cooling fluid flow depending on the needs of the design.

14 Claims, 1 Drawing Sheet

METHOD AND APPARATUS FOR COOLING AIR FLOW AT GAS TURBINE BUCKET TRAILING EDGE TIP

FIELD OF THE INVENTION

This invention relates in general to gas turbine blades and, more particularly, to an improved apparatus and method for cooling the orifice air flow at gas turbine bucket trailing edge tips.

BACKGROUND AND SUMMARY OF THE INVENTION

Description of the Prior Art

In gas turbine engines and the like, a turbine operated by burning gases drives a compressor which furnishes air to a combustor. Such turbine engines operate at relatively high temperatures. The capacity of such an engine is limited to a large extent by the ability of the material from which the turbine blades (sometimes referred to herein as "buckets") are made to withstand thermal stresses which develop at such relatively high operating temperatures. The problem may be particularly severe in an industrial gas turbine engine because of the relatively large size of certain engine parts, such as the turbine blades. To enable higher operating temperatures and increased engine efficiency without risking blade failure, hollow, convectively-cooled turbine blades are frequently utilized. Such blades generally have interior passageways which provide flow passages to ensure efficient cooling whereby all the portions of the blades may be maintained at relatively uniform temperature.

It is sometimes desirable, however, to vary the amount of cooling air flow within a turbomachinery blade due to uprated, improved turbine designs. The cooling air is at a premium since it must come from elsewhere within the turbine, and at the same time, it is desirable to pass no more cooling air flow than is necessary. Therefore, it would be advantageous to be able to vary or meter the amount of cooling air flow within a particular blade design to match the needs of the turbine.

U.S. Pat. No. 4,236,870 to Hucul, Jr., et al discloses one method of governing the magnitude of cooling air flow through the turbine blade which permits future modification of the blade cooling system without expensive alteration or blade redesign. The Hucul, Jr., et al patent utilizes a metering plate located at the base of the blade containing one or more metering orifices which communicate with the internal cooling passageways of the blade. However, replacing the metering plate to vary cooling air flow necessarily requires removal of the entire blade, and replacement of the metering plate changes the cooling characteristics throughout the entire blade, not just the tip.

Other turbine blade cooling systems and methods are disclosed in the following examples of the prior art:

| Patent No. | Inventor | Issued |
|---|---|---|
| 2,763,427 | Lindsey | Sept. 22, 1950 |
| 3,393,894 | Redsell | Dec. 5, 1966 |
| 3,825,984 | Linko et al | July 30, 1974 |
| 3,867,068 | Corsmeier et al | Feb. 18, 1975 |
| 4,203,706 | Hess | May 20, 1980 |
| 4,236,870 | Hucul, Jr. et al | Dec. 2, 1980 |

-continued

| Patent No. | Inventor | Issued |
|---|---|---|
| 4,859,141 | Maisch et al | Aug. 22, 1989 |

It has also been attempted to provide partial cooling air blockage, utilizing a sheet metal cover plate which partially blocks through-orifices at the trailing edge tip and in the end of the blade. This approach suffers from the disadvantage that stresses in the weld ligament attaching the trailing edge overhang are higher than desirable.

Another approach has been to reduce the size of the cooling orifices in the casting, where ceramic cores are used for the various orifices. A disadvantage of this approach, however, is a tendency toward breakage in the ceramic core of the trailing edge orifice.

Thus, there exists a need in the art for a low-cost, easily adjustable device and procedure for partially blocking the cooling air at the tip of an industrial gas turbine bucket.

SUMMARY OF THE INVENTION

In accordance with an exemplary embodiment of this invention, each turbomachinery blade contains at least one radial cooling passage connecting a hollow blade interior cavity with the outside of the blade. A transversely-oriented elongate channel connects at least one of the cooling passages with the trailing edge of the blade. Secured within the transversely-oriented channel is a pin which extends far enough into at least one of the radial cooling passages to partially obstruct the cooling fluid flow depending on the needs of the design.

A second intersecting hole is drilled from the bucket tip to the transversely-oriented channel and a punch is brought down through the intersecting hole to slightly deform the pin, staking it in place. In this way a method of tip air metering is provided at a reasonable cost without adding any significant manufacturing steps.

BRIEF DESCRIPTION OF THE DRAWINGS

The present invention will be better understood by reference to the following exemplary drawings wherein.

DETAILED DESCRIPTION OF THE EXEMPLARY EMBODIMENTS

Figure 1:
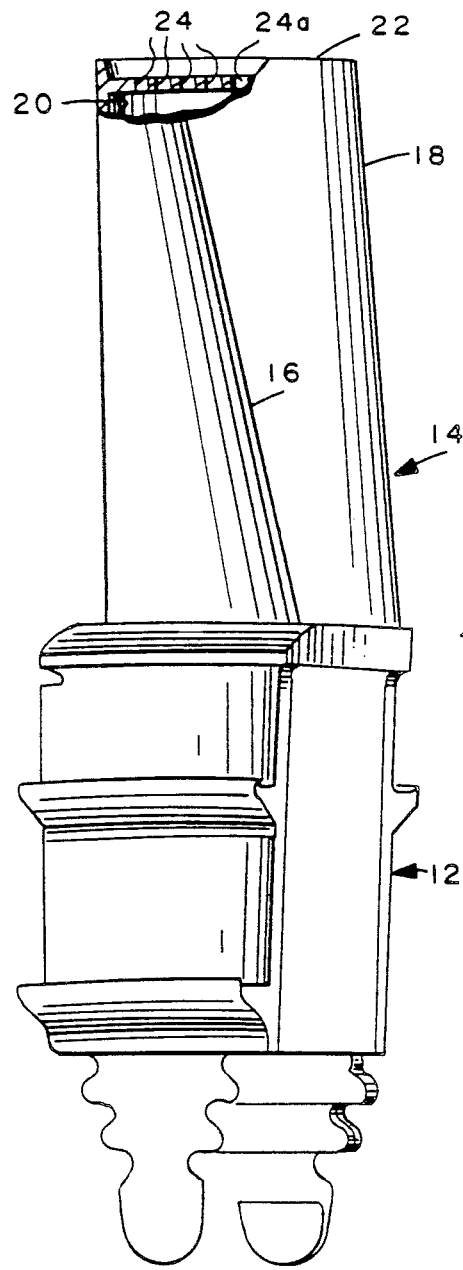
FIG. 1 is a plan view of an individual airfoil-shaped turbine blade utilized in the present invention.
Figure 3:
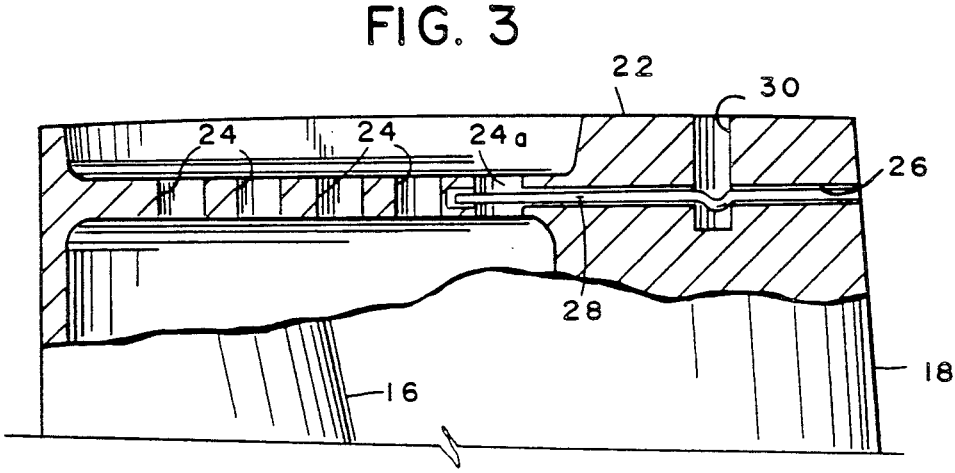
FIG. 3 is an enlarged, partial sectional plan view of the tip of the blade of FIG. 1 of the present invention.

Turning now to FIG. 1, a bucket 10 for an industrial gas turbine engine is shown and includes a base portion or root 12 adapted for connection to a rotatable hub (not shown), and a blade portion 14. The blade is typically airfoil-shaped, having a leading edge 16 and trailing edge 18. Blade portion 14 can contain any number of arrangements of internal cooling fluid passages forming an internal cavity 20, as shown partially in the cut-away portion of FIG. 1, with air being utilized as the cooling fluid in the preferred exemplary embodiment. The internal cooling air passageway arrangement forming cavity 20 is connected to the tip 22 of the blade portion 14 by a plurality of tip exit holes 24 as shown in FIGS. 1 and 3. In the preferred exemplary embodiment, there are five exit holes 24 and the metering method and system of the present invention is applied to the trailing edge tip exit hole 24a.

Figure 2:
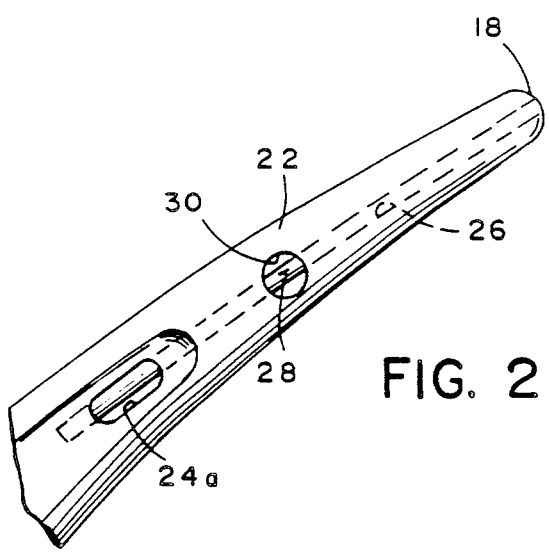
FIG. 2 is an enlarged top view of the trailing edge of the turbine blade of FIG. 1 of the present invention.

As shown in FIGS. 2 and 3, a channel 26 is drilled transversely from the trailing edge 18 and intersects with the trailing edge tip exit hole 24a. Preferably, channel 26 is oriented perpendicular, or transverse, to exit hole 24a. An elongate pin 28 is inserted into channel 26 and extends into the trailing edge tip exit hole 24a. Depending on the curvature of the blade 10 and the amount of cooling desired, channel 26 can be extended further into other tip exit holes 24, and the invention is not limited to intersection solely with the trailing edge tip exit hole 24a. The length of pin 28 can be varied, as can its location within channel 26 to meter the amount of air flowing out of the trailing edge tip exit hole 24a.

In the preferred exemplary embodiment, in order to secure the pin 28 within channel 26 a radially-oriented hole 30 is drilled from the tip 22 of blade portion 14 radially downward so that it intersects channel 26 at a point between trailing edge tip exit hole 24a and the trailing edge 18, as shown in FIGS. 2 and 3. With pin 28 correctly located within channel 26 so as to meter the desired amount of air, a punch can be brought down into the intersecting hole 30 to slightly deform pin 28 to prevent it from moving longitudinally within channel 26, thus staking it in place. In the preferred embodiment, pin 28 is constructed of a ductile, oxidation-resistant material with a diameter of about 0.045 inches. Other suitable material may also be employed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbomachinery bucket, comprising:
   a blade portion,
   an internal coolant fluid cavity located within said blade portion,
   one or more radial passages located in an outer tip of said blade portion, connecting said internal coolant fluid cavity to atmosphere;
   an elongate channel located within said blade portion, said channel connecting at least one or more of said radial passages with a trailing edge of said blade portion; and
   means for at least partially obstructing said one or more radial passages, said obstructing means securedly fixed within said channel and extending into at least one or more of said radial passages.

2. A turbomachinery blade as in claim 1, wherein said channel is oriented substantially perpendicular to said at least one of said radial passages.

3. A turbomachinery blade as in claim 1, wherein said obstructing means comprises an elongate pin securedly fixed within said channel.

4. A turbomachinery blade as in claim 3, further comprising:
   an access hole in said tip located between at least one of said passages and the trailing edge of said blade portion, and wherein said access hole intersects said channel.

5. A turbomachinery blade as in claim 4, wherein said pin contains a bend where said access hole intersects said channel.

6. A turbine blade construction comprising:
   a root portion adapted for connection to a rotatable hub;
   a blade portion extending from said root portion;
   a coolant fluid cavity in said blade portion communicating with atmosphere via at least one passage; and
   a metering pin extending at least partially into said at least one passage, lying in a channel extending substantially perpendicularly to said at least one passage, said metering pin adapted to meter coolant fluid flow out of said at least one passage.

7. The turbine blade construction of claim 6 wherein said at least one passage extends radially of said blade portion.

8. The turbine blade construction of claim 6 wherein said channel extends substantially perpendicularly from a trailing edge of said blade portion.

9. The turbine blade construction of claim 6 wherein said metering pin to be staked in said channel.

10. The turbine blade construction of claim 9 wherein said means comprises an access hole extending from a tip of said blade portion to said channel.

11. A method for varying the cooling fluid flow within a turbomachinery blade containing one or more radial cooling passages connecting a hollow interior cavity formed in the blade to atmosphere, comprising the steps of:
    a. forming an elongate channel connecting at least one of the one or more radial cooling passages with a trailing edge of said blade, and
    b. inserting an elongate pin into said channel sufficiently to project into at least one of the passages to thereby at least partially obstruct the cooling fluid flow.

12. The method of claim 8, and including the additional steps of:
    forming an access hole within the blade which connects the elongate channel with a tip of the blade; and
    deforming the pin at a point where the access hole and the elongate channel intersect to stake the pin in the elongate channel.

13. The method of claim 11, wherein the pin is constructed of a ductile, oxidation-resistant material.

14. The method of claim 11, wherein the pin has a diameter of about 0.045 inch.

* * * * *